US012808422B2

(12) United States Patent
Franczyk et al.

(10) Patent No.: US 12,808,422 B2

(45) Date of Patent: Nov. 24, 2026

(54) DAMPER ASSEMBLY WITH CLAMPED FREQUENCY DEPENDENT VALVE

(71) Applicant: BeijingWest Industries Co., Ltd., Beijing (CN)

(72) Inventors: Bartłomiej Franczyk, Cracow (PL); Pawel Slusarczyk, Myslenice (PL); Karol Pilawski, Myslenice (PL)

(73) Assignee: BeijingWest Industries Co., Ltd., Beijing (CN)

(*) Notice: Subject to any disclaimer, the term of this patent is extended or adjusted under 35 U.S.C. 154(b) by 497 days.

(21) Appl. No.: 18/380,636

(22) Filed: Oct. 16, 2023

(65) Prior Publication Data

US 2024/0288047 A1 Aug. 29, 2024

(30) Foreign Application Priority Data

Feb. 27, 2023 (CN) ......................... 202310181321.5

(51) Int. Cl.
*F16F 9/348* (2006.01)

(52) U.S. Cl.
CPC .......... *F16F 9/3482* (2013.01); *F16F 9/3488* (2013.01); *F16F 2228/04* (2013.01)

(58) Field of Classification Search
CPC ........... F16F 9/348–3488; F16F 9/3214; F16F 9/3405; F16F 9/469; F16F 2228/04
See application file for complete search history.

(56) References Cited

U.S. PATENT DOCUMENTS

| | | | |
|---|---|---|---|
| 5,706,920 A | 1/1998 | Pees et al. | |
| 6,085,876 A | 7/2000 | Deferme | |
| 11,511,585 B2 | 11/2022 | Senar | |
| 2005/0115786 A1 | 6/2005 | Forster | |

(Continued)

FOREIGN PATENT DOCUMENTS

| | | |
|---|---|---|
| CN | 112360913 A | 2/2012 |
| CN | 104204601 A | 12/2014 |

(Continued)

OTHER PUBLICATIONS

Extended European Search Report issued on Jul. 29, 2024 for counterpart European patent application No. 24158615.5.

(Continued)

*Primary Examiner* — David R Morris
(74) *Attorney, Agent, or Firm* — Dickinson Wright PLLC

(57) ABSTRACT

A damper assembly includes a damper tube extending along a center axis and defining a fluid compartment. A piston is attached to a damper rod and divides the fluid compartment into a compression chamber and a rebound chamber. The piston includes a piston body and a frequency-dependent (FD) valve. The piston body defines an intermediate chamber in fluid communication with the rebound chamber. The FD valve includes: an FD housing having a tubular shape surrounding an FD chamber, an FD slider disposed within the FD housing and dividing the FD chamber into an FD pressure chamber and an FD displacement chamber, an FD control stack configured to regulate fluid flow between the intermediate chamber and the FD pressure chamber, and an FD working disc configured to deflect together with the FD housing for regulating fluid flow between the rebound chamber and the compression chamber.

20 Claims, 5 Drawing Sheets

(56) References Cited

U.S. PATENT DOCUMENTS

| | | | | |
|---|---|---|---|---|
| 2009/0084647 | A1 | 4/2009 | Maneyama et al. | |
| 2014/0318908 | A1 | 10/2014 | Kazmirski et al. | |
| 2015/0047936 | A1* | 2/2015 | Slusarczyk | F16F 9/512 188/313 |
| 2015/0204410 | A1* | 7/2015 | Flacht | F16F 9/5126 188/313 |
| 2015/0276005 | A1* | 10/2015 | Kim | F16F 9/348 188/317 |
| 2018/0187738 | A1 | 7/2018 | Forster | |
| 2018/0306264 | A1* | 10/2018 | Slusarczyk | F16F 9/3257 |
| 2018/0306266 | A1* | 10/2018 | Knapczyk | F16F 9/3481 |
| 2019/0293144 | A1 | 9/2019 | Patel et al. | |
| 2021/0164534 | A1* | 6/2021 | Slusarczyk | F16F 9/3214 |
| 2022/0268335 | A1 | 8/2022 | Yasui | |

FOREIGN PATENT DOCUMENTS

| | | | |
|---|---|---|---|
| CN | 107013623 | A | 8/2017 |
| CN | 113217572 | A | 9/2022 |
| DE | 2038984 | A1 | 2/1972 |
| DE | 102015205556 | A1 | 10/2015 |
| EP | 0546902 | A1 | 6/1993 |
| EP | 0632212 | A2 | 1/1995 |
| EP | 0671572 | A1 | 9/1995 |
| EP | 3396198 | A2 | 10/2018 |
| EP | 3828435 | A1 | 6/2021 |
| EP | 3907419 | A1 | 11/2021 |
| GB | 2373307 | B | 9/2002 |
| JP | 53132673 | A | 11/1978 |
| JP | 6110135 | A | 1/1986 |
| JP | 06137358 | A | 5/1994 |
| JP | 08135713 | A | 5/1996 |
| JP | 09291961 | A | 11/1997 |
| JP | 2001214951 | A | 8/2001 |
| JP | 2007255585 | A | 10/2007 |
| KR | 20150048445 | A | 5/2015 |

OTHER PUBLICATIONS

The First Office Action and search report issued on Apr. 3, 2025 for counterpart Chinese patent application No. 202310181321.5, along with machine EN translation downloaded from EPO.

Jungong Wang et al, Research on Hydraulic Damper, Hydraulics Pneumatics & Seals, Shangai Jiao Tong University, 1998 (8 pages).

Supplementary Search Report issued on Jun. 27, 2025 for counterpart Chinese patent application No. 2023101813215, along with machine EN translation.

* cited by examiner

DAMPER ASSEMBLY WITH CLAMPED FREQUENCY DEPENDENT VALVE

CROSS-REFERENCE TO RELATED APPLICATIONS

This applications claims priority to Chinese Patent Application No. 202310181321.5, filed on Feb. 27, 2023, which is hereby incorporated by reference in its entirety.

BACKGROUND OF THE INVENTION

1. Field of the Invention

The present invention generally relates to a damper assembly for a vehicle.

2. Description of the Prior Art

Damper assemblies are well known in the art for use in a vehicle. One such a damper assembly is disclosed in patent publication U.S. Pat. No. 5,706,920A which discloses a monotube damper assembly including a main tube disposed on a center axis and extending between a first end and a second end. The damper defines a fluid compartment between the first end and the second end for containing a working fluid. A main piston is slidably disposed in the fluid compartment dividing the fluid compartment into a rebound chamber and a compression chamber. A piston rod is disposed on the center axis extending along the center axis to a distal end and attached to the main piston for moving the main piston between a compression stroke and a rebound stroke.

Conventional, passive shock absorber valves offer a poor compromise between performance, safety and driving comfort. To improve this situation, active and semi-active suspensions are often proposed. They, however, require the use of additional sensors, ECUs and control algorithms, what makes them complicated and extremely expensive. For this reason, adaptive passive valves are becoming more and more popular and are desired by car manufacturers.

Various adaptive valve technologies provide damping characteristics that depend not only on damper velocity but also on excitation frequency. Such solutions allow to achieve high damping forces for low frequencies, related to body motions and low damping forces for high frequencies, related to vibrations of the wheels.

It is known in the art for damper assemblies to include a frequency-dependent valve assembly to provide the damper assembly with the ability to reduce the level of damping force for high frequency events to provide better comfort and road holding for occupants. However, known valve assemblies are generally expensive, complex and have limited capabilities for tuning. Furthermore, most existing frequency-dependent valves are configured as add-ons that are attached to an existing damper design. These add-on valves may significantly increase dead-length of a damper. Moreover, they often require drilling of additional, intersecting bypass holes, which is an expensive process that generates contaminants and can weakens portions of the damper, such as a valve tenon. Accordingly, an improved damper assembly is desired.

SUMMARY OF THE INVENTION

The present invention provides a damper assembly. The damper assembly includes a damper tube having a tubular shape extending along a center axis and defining a fluid compartment. The damper assembly also includes a piston attached to a damper rod and movable through the damper tube along the center axis and dividing the fluid compartment into a compression chamber and a rebound chamber, the piston including a piston body and a frequency-dependent (FD) valve. The piston body defines an intermediate chamber in fluid communication with the rebound chamber. The FD valve includes: an FD housing having a tubular shape surrounding an FD chamber, an FD slider disposed within the FD housing and dividing the FD chamber into an FD pressure chamber and an FD displacement chamber, an FD control stack configured to regulate fluid flow between the intermediate chamber and the FD pressure chamber, and an FD working disc configured to deflect together with the FD housing for regulating fluid flow between the rebound chamber and the compression chamber.

The present invention also provides a piston for a damper assembly. The piston includes a piston body that defines an intermediate chamber. The piston also includes a frequency-dependent (FD) valve. The FD valve includes: an FD housing having a tubular shape surrounding an FD chamber, an FD slider disposed within the FD housing and dividing the FD chamber into an FD pressure chamber and an FD displacement chamber, an FD control stack configured to regulate fluid flow between the intermediate chamber and the FD pressure chamber, and an FD working disc configured to deflect together with the FD housing for regulating fluid flow between a rebound chamber and a compression chamber.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, it is one aspect of the present invention to provide a damper assembly 20, which may be used as a part of a suspension in a vehicle, such as a passenger car or truck. The damper assembly 20 of the present disclosure is shown as a monotube damper. However, the principles of the present disclosure may be used with other types of dampers, such as in a twin-tube damper.

The damper assembly 20 of the present disclosure provides a unique solution for the implementation of a frequency adaptive section within a piston valve assembly.

Figure 1:
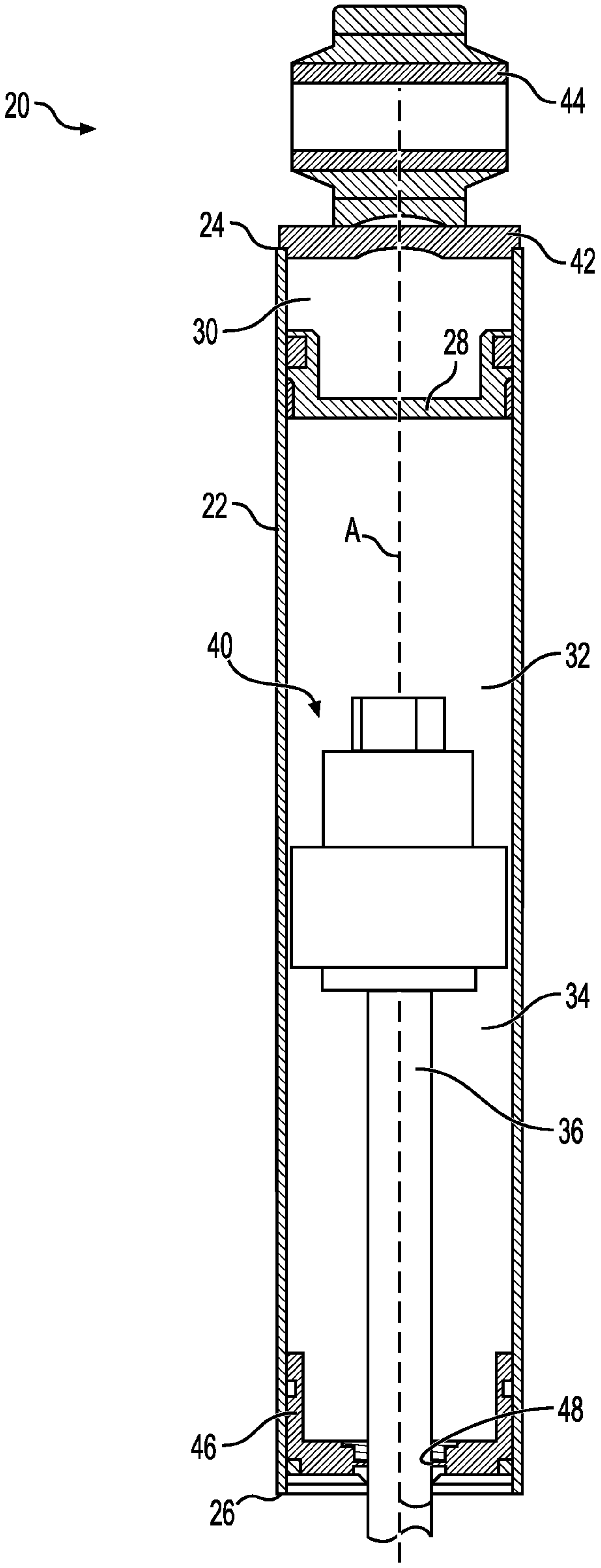
FIG. 1 shows a cross-sectional perspective view of a damper assembly.

As generally shown in FIG. 1, the damper assembly 20 includes a damper tube 22 having a tubular shape extending along a center axis A between a first end 24 and a second end 26 and defining a main compartment 30, 32, 34 therein. The damper assembly 20 also includes a gas cup 28 disposed in the main compartment 30, 32, 34 in sealing engagement with the damper tube 22 and slidable along the center axis A to divide the main compartment 30, 32, 34 into a gas compartment 30 for containing a gas and a fluid compartment 32, 34. The gas compartment 30 extends between the first end 24 and the gas cup 28, and the fluid compartment 32, 34 extends between the gas cup 28 and the second end 26.

The damper assembly 20 also includes a damper rod 36 that extends along the center axis A. The damper rod 36 includes a rod end 38 located inside of the fluid compartment 32, 34. A piston 40 is attached to the damper rod 36 adjacent to the rod end 38, and configured to move with the damper rod 36 along the center axis A through the damper tube 22. The piston 40 divides the fluid compartment 32, 34 into a compression chamber 32 and a rebound chamber 34. The compression chamber 32 extends between the piston 40 and the gas cup 28, and the rebound chamber 34 extends between the second end 26 and the piston 40.

A first closure 42 seals the gas compartment 30 at the first end 24 of the damper tube 22. A damper mount 44 is attached to the first closure 42 and configured to attach the damper assembly 20 to a body of a vehicle (not shown). The damper assembly 20 of the present disclosure may be used in other configurations and/or orientations. For example, the damper mount 44 may connect the damper tube 22 of the damper assembly 20 to a chassis component of the vehicle 10.

The damper assembly 20 also includes a second closure 46 disposed adjacent to the second end 26 of the damper tube 22 to enclose the rebound chamber 34. The second closure 46 defines a bore 48 for the damper rod 36 to pass through. The second closure 46 may provide a fluid-tight seal with the damper rod 36 to prevent fluid from leaking out of the rebound chamber 34.

Figure 2:
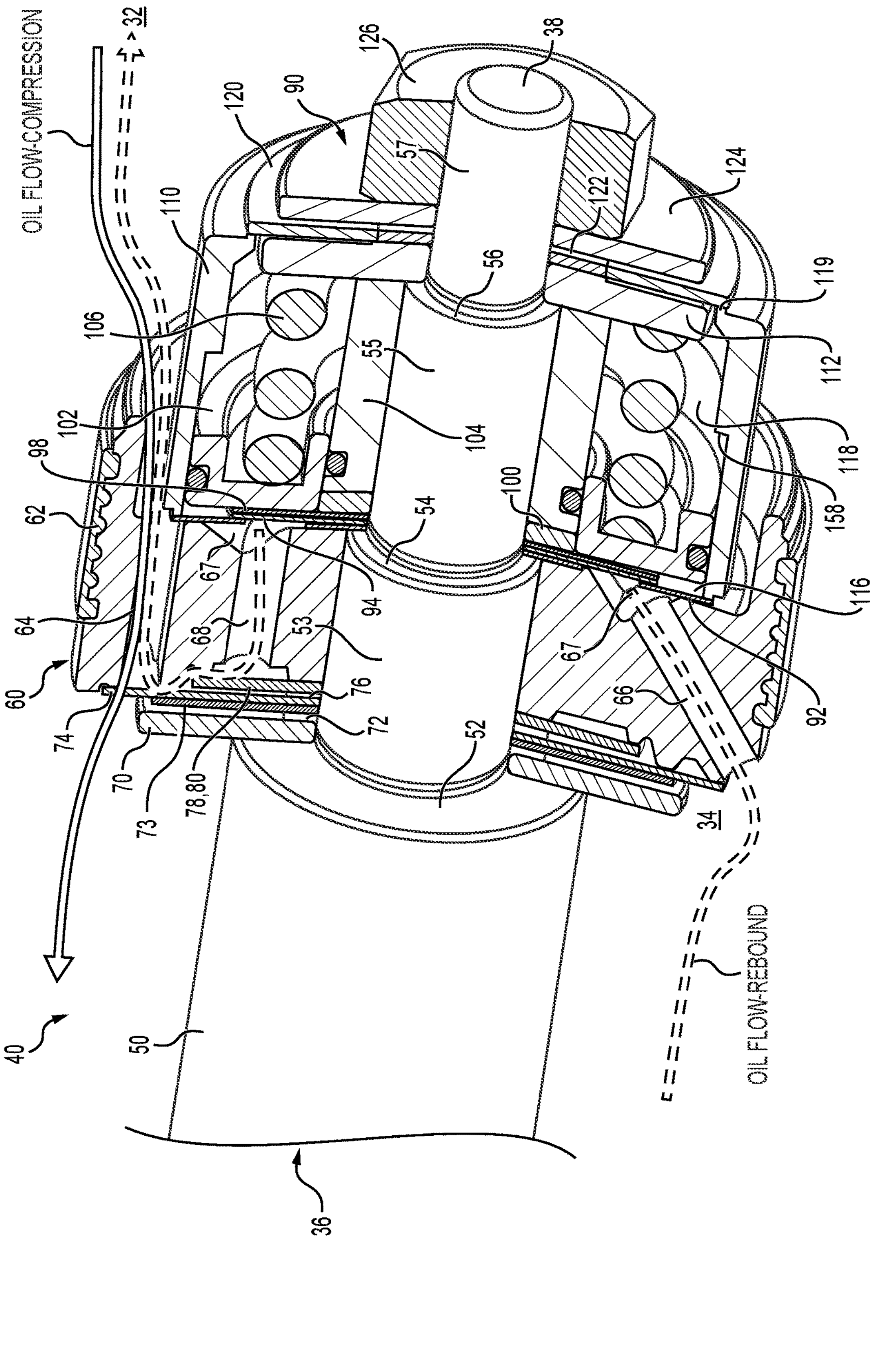
FIG. 2 shows an enlarged cut-away perspective view of a piston of the damper assembly, including a frequency-dependent valve.

FIG. 2 shows an enlarged cut-away perspective view of a piston 40 of the damper assembly 20, including a frequency-dependent valve 90. As shown in FIG. 2, the damper rod 36 includes a rod body 50 having a cylindrical shape, a first rod shoulder 52 facing toward the rod end 38. The damper rod 36 also includes a first rod extension 53 extending from the first rod shoulder 52 toward the rod end 38 and having a generally cylindrical shape with a smaller diameter than the rod body 50. The first rod extension 53 defines a second rod shoulder 54 facing toward the rod end 38. The damper rod 36 also includes a second rod extension 55 extending from the second rod shoulder 54 toward the rod end 38 and having a generally cylindrical shape with a smaller diameter than the first rod extension 53. The second rod extension 55 defines a third rod shoulder 56 facing toward the rod end 38. The damper rod 36 also includes a third rod extension 57 extending from the third rod shoulder 56 to the rod end 38 and having a generally cylindrical shape with a smaller diameter than the second rod extension 55.

As also shown in FIG. 2, the piston 40 includes a piston body 60 disposed around the first rod extension 53. The piston body 60 includes an annular seal 62 of resilient material configured to seal against an inner surface of the damper tube 22 (not shown in FIG. 2). The piston body 60 defines a compression passage 64 in fluid communication with the compression chamber 32 and providing a path for fluid flow to the rebound chamber 34. The piston body 60 defines a first rebound passage 66 in fluid communication with the rebound chamber 34 and extending axially and radially inwardly away from the rebound chamber 34. The piston body 60 also defines an intermediate chamber 67 having an annular shape in fluid communication with the rebound chamber 34 via the first rebound passage 66. The piston body 60 also defines a second rebound passage 68 in fluid communication with the intermediate chamber 67 and extending in an axial direction therefrom and toward the first rod shoulder 52. The first rebound passage 66, the intermediate chamber 67, and the second rebound passage 68 together provide a path for fluid flow to the compression chamber 32 during a rebound stroke.

The piston 40 also includes a compression valve assembly 70, 72, 73, 74 configured to regulate fluid flow from the compression chamber 32 to the rebound chamber 34 during a compression stroke, with the damper rod 36 pushing the piston 40 toward the first end 24 of the damper tube 22. The compression valve assembly 70, 72, 73, 74 includes a compression disc retainer 70 having a ring shape disposed about the first rod extension 53 and contacting the first rod shoulder 52. The compression valve assembly 70, 72, 73, 74 also includes a first spacer ring 72 having a ring shape disposed about the first rod extension 53 adjacent to the compression disc retainer 70 and opposite from the first rod shoulder 52. The compression valve assembly 70, 72, 73, 74 also includes a compression disc stack 73, 74 covering an end of the compression passage 64 opposite from the compression chamber 32. The compression disc stack 73, 74 includes a plurality of first compression discs 73 and a plurality of second compression discs 74 that are wider than the first compression discs 73. However, the compression disc stack 73, 74 may include a different number of the first compression discs 73 and/or the second compression discs 74. Alternatively, the compression disc stack 73, 74 may include only discs having a uniform size. For example, the compression disc stack 73, 74 may include only the first compression discs 73 and/or only the second compression discs 74. The first spacer ring 72 has a smaller diameter than the compression disc stack 73, 74 and supports an inner portion of the compression disc stack 73, 74, leaving an outer portion of the compression disc stack 73, 74 unsupported and able to be deflected away from the compression passage 64 in response to a pressure differential thereacross, and to thereby regulate fluid flow through the compression passage 64 and into the rebound chamber 34.

The piston 40 also includes a rebound valve assembly 76, 78, 80 configured to regulate fluid flow from the rebound chamber 34 to the compression chamber 32 during a rebound stroke, with the damper rod 36 pulling the piston 40 toward the second end 26. The rebound valve assembly 76, 78, 80 includes a second spacer ring 76 having a ring shape disposed about the first rod extension 53 adjacent to the compression disc stack 73, 74 and opposite from the first spacer ring 72. The rebound valve assembly 76, 78, 80 also includes a rebound disc stack 78 including a plurality of discs covering an end of the second rebound passage 68 opposite from the frequency-dependent valve 90. The second spacer ring 76 has a smaller diameter than the rebound disc stack 78 and supports an inner portion of the rebound disc stack 78, leaving an outer portion of the rebound disc stack 78 unsupported and able to be deflected away from the second rebound passage 68 in response to a pressure differential thereacross, and to thereby regulate fluid flow through the second rebound passage 68 and into the compression chamber 32.

The rebound valve assembly 76, 78, 80 also includes a rebound bypass disc 80 disposed between the second rebound passage 68 and the rebound disc stack 78. The rebound bypass disc 80 has a disc shape with a plurality of notches in a peripheral edge thereof to provide a limited fluid communication between the second rebound passage 68 and the compression passage 64, which may equalize pressure therebetween and when the rebound disc stack 78 is not deflected away from the second rebound passage 68.

FIG. 2 also shows details of the frequency-dependent (FD) valve 90, including an FD slider 102 having an annular shape disposed around an FD guide 104. The FD guide 104 has a tubular shape that is disposed around the second rod extension 55 and extending from the second rod shoulder 54 to the third rod shoulder 56. The FD guide 104 may provide a fluid-tight seal with the FD slider 102.

Still referring to FIG. 2, the FD valve 90 also includes an FD housing 110 that has a generally tubular shape disposed annularly around the FD slider 102. The FD housing 110 is partially disposed within the piston body 60 and protrudes therefrom in an axial direction toward the toward the rod end 38. A spring retainer 112 is disposed within the FD housing 110 annularly around the third rod extension 57 and abutting the third rod shoulder 56. The spring retainer 112 contacts the coil spring 106, with the coil spring 106 extending therefrom and to the FD slider 102. The FD housing 110 defines an FD chamber 116, 118, with the FD slider 102 dividing the FD chamber 116, 118 into an FD pressure chamber 116 and an FD displacement chamber 118.

The FD valve 90 also includes an FD control stack 92, 94, 98, 100 disposed around the second rod extension 55 between the intermediate chamber 67 and the FD slider 102. The FD control stack 92, 94, 98, 100 is best shown in the exploded diagram on FIG. 3 and includes a slotted disc 92, an FD control disc 94, and an FD deflective disc 98. The slotted disc 92 supports the FD control disc 94 and defines a plurality of apertures 93 allowing fluid to flow into the FD pressure chamber 116 through a control orifice 96.

A coil spring 106 contacts the FD slider 102 and biases the FD slider 102 toward the FD control stack 92, 94, 98, 100.

An FD working disc stack 120 including one or more FD working discs overlies the spring retainer 112 and contacts a rim 119 of the FD housing 110. The FD working disc stack 120 is configured to deflect together with the FD housing 110 for regulating fluid flow between the rebound chamber 34 and the compression chamber 32 by applying additional force to the FD housing 110. The FD working disc stack 120 includes an FD bypass disc 114 having a number of notches in a peripheral edge thereof to allow fluid from within the FD displacement chamber 118 to flow into the compression chamber 32. The FD valve 90 also includes a fourth spacer ring 122 having a ring shape disposed about the third rod extension 57 and adjacent to the FD working disc stack 120 and opposite from the spring retainer 112. The fourth spacer ring 122 has a smaller diameter than the FD working disc stack 120 and supports an inner portion of the FD working disc stack 120, leaving an outer portion of the FD working disc stack 120 unsupported and able to be deflected together with the FD housing 110 in response to a pressure differential thereacross, and to thereby regulate fluid flow from the FD displacement chamber 118 and into the compression chamber 32.

The FD valve 90 also includes an FD disc retainer 124 having a disc shape disposed around the third rod extension 57 and overlying the fourth spacer ring 122, opposite from the FD working disc stack 120. A fastener 126 is disposed around the third rod extension 57 and contacting the FD disc retainer 124 for securing the FD valve 90 to the damper rod 36. The fastener 126 may include a nut that threadedly engages the third rod extension 57, although other types of fasteners may be used.

As shown on FIG. 2, the FD valve 90 is located in a rebound flow path of the piston 40, thus acting in rebound stroke. Both main valves, including the compression valve assembly 70, 72, 74 and the rebound valve assembly 76, 78, 80 are located on the rod-side of the piston 40, opposite from the rod end 38. The FD valve 90 acts as a secondary valve, working in parallel to the rebound valve assembly 76, 78, 80, releasing the pressure depending on the excitation frequency or, more precisely, on a pressure rate in the FD pressure chamber 116.

Figure 3:
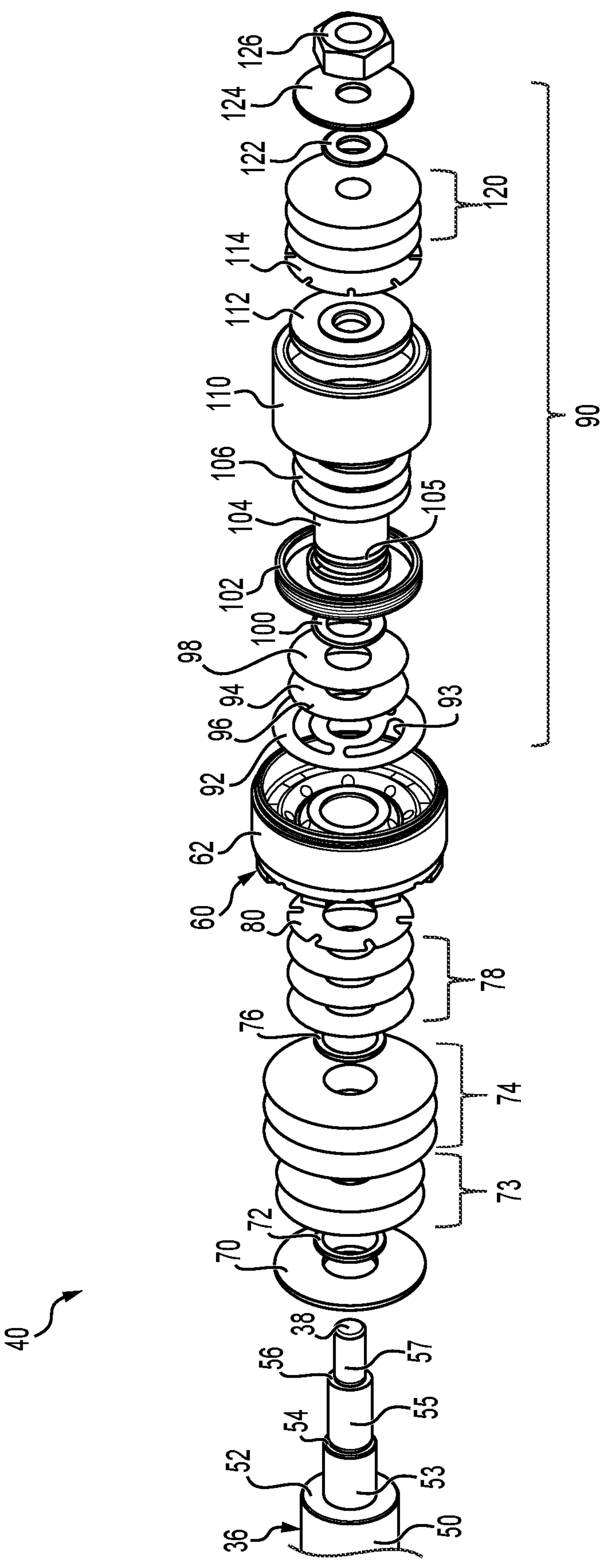
FIG. 3 shows an exploded view of the piston of the damper assembly including the frequency-dependent valve.

FIG. 3 shows an exploded view of the piston 40 of the damper assembly 20, including the FD valve 90. As shown in FIG. 3, the compression disc stack 73, 74 includes five discs having two different sizes. However, the compression disc stack 73, 74 may have a different number of discs and/or a different configuration with all of the discs having a uniform size and/or two or more different sizes. As also shown in FIG. 3, the rebound disc stack 78 includes three discs all having a uniform size. However, the rebound disc stack 78 may have may have a different number of discs and/or a different configuration of discs with two or more different sizes. As also shown in FIG. 3, the FD control stack 92, 94, 98, 100 includes a single FD deflective disc 98. However, the FD control stack 92, 94, 98 may include a stack with two or more of the FD deflective discs 98, which may have characteristics, such as width, thickness, and material, that are tuned to a particular application.

As also shown in FIG. 3, the FD control disc 94 defines a control orifice 96 in a peripheral edge thereof. The function of the FD control disc 94 is described in more detail below with reference to FIGS. 4A-4B. As also shown in FIG. 3, the FD working disc stack 120 includes three discs all having a uniform size. However, the FD working disc stack 120 may include a different number of discs, and the discs of FD working disc stack 120 may have a different configuration with two or more different shapes and/or sizes.

As shown in FIG. 3, the FD valve 90 also includes an FD bypass disc 114 disposed between the spring retainer 112 and the FD working disc stack 120. The FD bypass disc 114 has a disc shape with a plurality of notches in a peripheral edge thereof to provide a fluid communication between the FD displacement chamber 118 and the compression chamber 32, and thus enables free movement of the FD slider 102 toward the rod end 38.

Figure 4A:
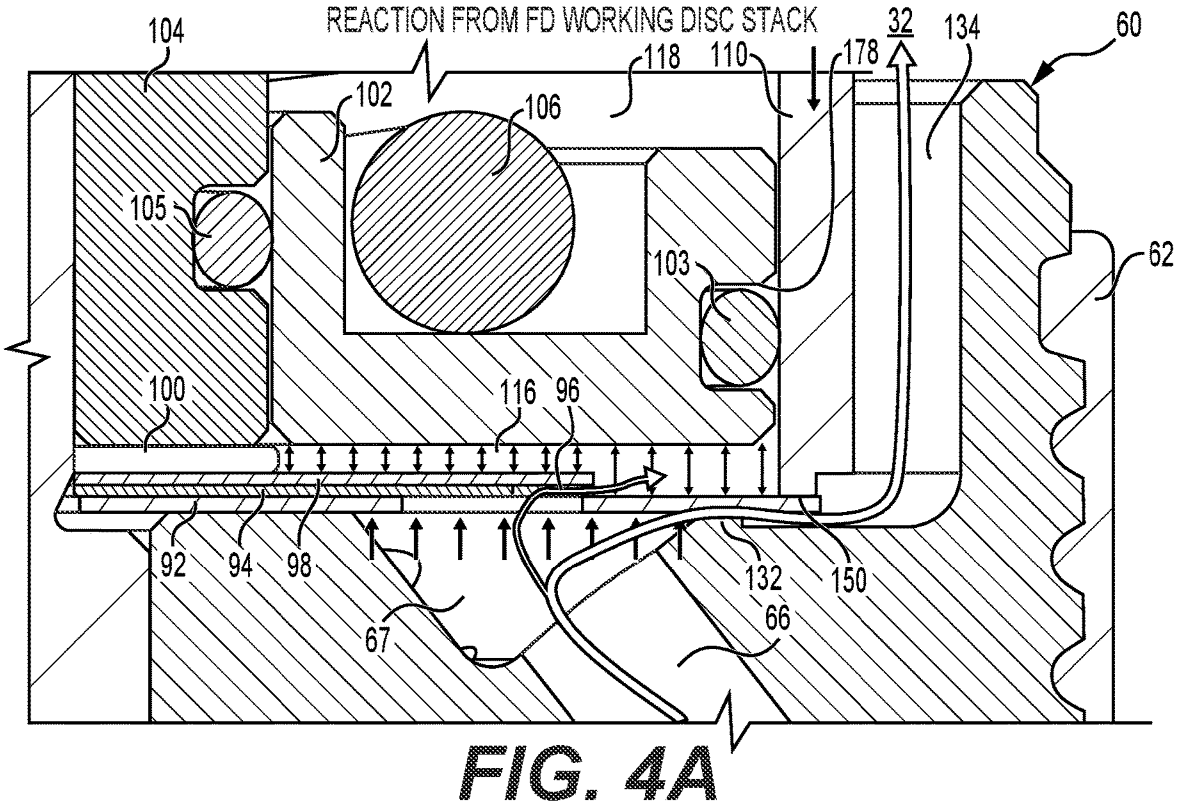
FIG. 4A shows a fragmentary cross-sectional view of the piston of the damper assembly illustrating reaction of the frequency-dependent working disc to a high-frequency excitation.
Figure 4B:
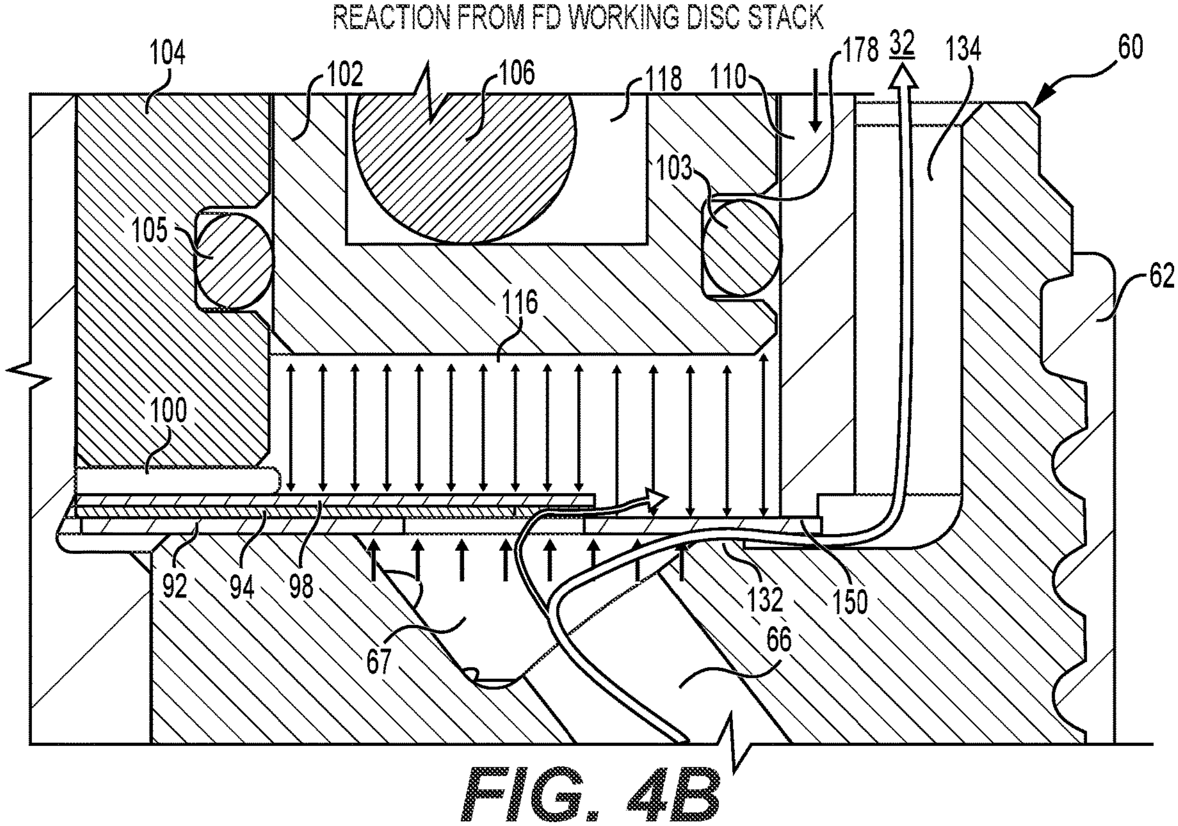
FIG. 4B shows a fragmentary cross-sectional view of the piston of the damper assembly illustrating reaction of the frequency-dependent working disc to a low-frequency excitation.

FIGS. 4A-4B each shows a fragmentary cross-sectional view of the piston 40, illustrating reaction of the FD valve 90 to different excitations. Specifically, FIG. 4A shows a condition of the piston 40 when the damper assembly 20 under a high-frequency excitation condition, and FIG. 4B shows a condition of the piston 40 when the damper assembly 20 under a low-frequency excitation condition. FIGS. 4A-4B also show some additional structural details of the piston 40. As shown in FIGS. 4A-4B, a first O-ring seal 103 is disposed in a corresponding annular bore 178 in an outer surface of the FD slider 102 to provide a fluid-tight seal between the FD slider 102 and an inner surface of the FD housing 110. A second O-ring seal 105 is disposed in a corresponding annular bore in an outer surface of the FD guide 104 for sealing against a radially-inner surface of the FD slider 102. The first O-ring seal 103 and the second O-ring seal 105, together, function to prevent fluid from migrating between the FD pressure chamber 116 and the FD displacement chamber 118 as the FD slider 102 is translated within the FD housing 110.

As best shown in FIGS. 4A-4B, a first axial end 150 of the FD housing 110 contacts an upper surface of the slotted disc 92, adjacent to a peripheral edge thereof. The piston body 60 defines an annular ridge 132 that supports a lower surface of the slotted disc 92 to regulate a fluid flow from the first rebound passage 66 and to the compression chamber 32 via an FD passage 134 that extends annularly between the FD housing 110 and the piston body 60.

During the rebound stroke, fluid flows from the rebound chamber 34 via the first rebound passage 66 and the intermediate chamber 67, through the control orifice 96 in the FD control disc 94 and into the FD pressure chamber 116, causing the FD slider 102 to move in an axial direction toward the rod end 38. In other words, the control orifice 96 in the FD control disc 94 provides fluid communication between the intermediate chamber 67 and the FD pressure chamber 116, as indicated by the small flow arrow on FIGS. 4A-4B.

When a sufficient pressure occurs in the FD pressure chamber 116, the FD slider 102 moves axially towards the rod end 38 (i.e. away from the FD control stack 92, 94, 98, 100, thus increasing volume of the FD pressure chamber 116. The FD bypass disc 114 located adjacent to the FD working disc stack 120 enables oil to freely flow into and out of the FD displacement chamber 118, where the coil spring 106 is located, and thus enables free movement of the FD slider 102.

Operation of the FD valve 90 is tuned by flow area of the control orifice 96 in the FD control disc 94, spring rate and preload of the coil spring 106 as well as quantity and thickness of the discs of the FD working disc stack 120. The FD working disc stack 120 is responsible for generating primary damping force of FD valve 90, while FD control stack 92, 94, 98, 100 is responsible for FD valve enhancement at low frequencies. The FD working disc stack 120 also holds the FD housing 110 housing in place and biases the FD housing 110 in an axial direction towards the slotted disc 92 when the FD valve 90 closes.

Figure 5:
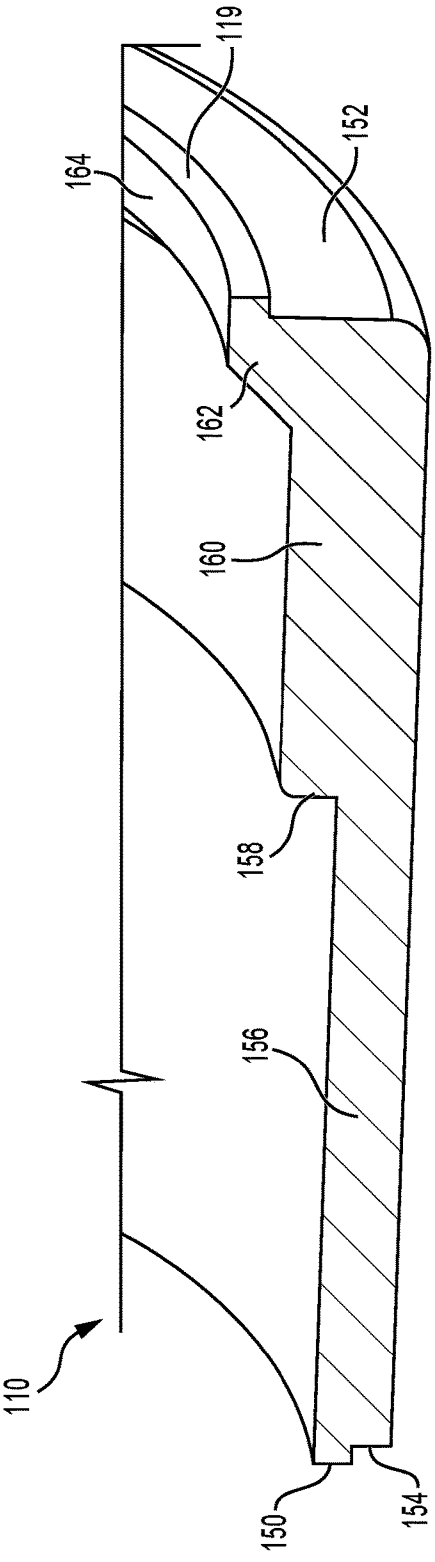
FIG. 5 shows a fragmentary cross-sectional view of the FD valve housing of the piston of the damper assembly of the present disclosure.

FIG. 5 shows a fragmentary cross-sectional view of the FD housing 110. As shown, the FD housing 110 includes a generally tubular shape that extends between a first axial end 150 and a second axial end 152. As best shown on FIG. 4B, the first axial end 150 may contact the slotted disc 92. Referring back to FIG. 5, the first axial end 150 defines an annular notch 154 in an outside surface to facilitate fluid flow to the compression chamber 32 via the FD passage 134. The FD housing 110 includes a first tubular portion 156 extending axially from the first axial end 150 to a catch surface 158 having a ring shape facing toward the first axial end 150. The FD housing 110 also includes a second tubular portion 160 that extends from the catch surface 158 to the second axial end 152. The first tubular portion 156 and the second tubular portion 160 have a same outside diameter, providing the FD housing 110 with a smooth outer surface. However, the second tubular portion 160 has a smaller inside diameter than an inside diameter of the first tubular portion. The FD housing 110 also includes an end support 162 that extends radially inwardly from the second tubular portion 160 adjacent to the first axial end 150 and which supports an annular ridge 164 that extends axially beyond the first axial end 150 to define the rim 119 of the FD housing 110.

The FD slider 102 may engage the catch surface 158 to define a maximum axial travel limit of the FD slider 102, which may limit a maximum pressure level in the FD pressure chamber 116. When the FD slider 102 contacts the catch surface 158, the FD slider 102 may push the FD housing 110 away from the slotted disc 92, providing enhanced flow through the FD valve 90, as illustrated in FIG. 4B.

Figure 6:
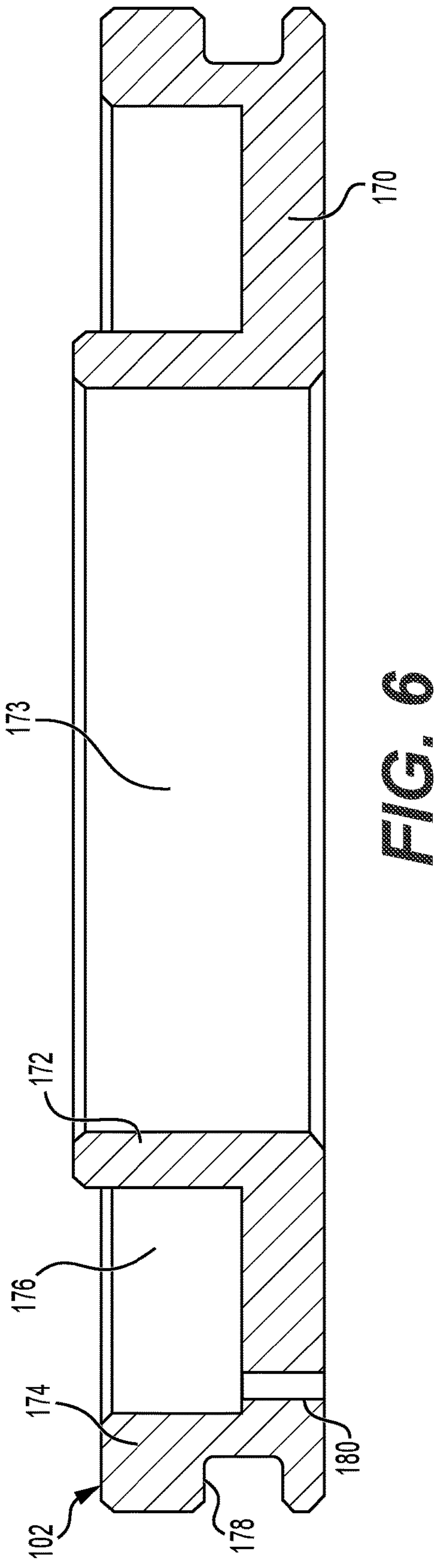
FIG. 6 shows a cross-sectional view of the FD slider of the piston of the damper assembly of the present disclosure.

FIG. 6 shows a cross-sectional view of the FD slider 102. The FD slider 102 includes a disc-shaped base 170 and an inner tubular portion 172 coupled to the disc-shaped base 170 and extending axially therefrom. The inner tubular portion 172 defines a slider bore 173 configured to surround the second rod extension 55 and to slide axially therealong. The FD slider 102 also includes an outer tubular portion 174 coupled to the disc-shaped base 170 adjacent to a peripheral edge thereof and extending axially therefrom. The outer tubular portion 174 is disposed annularly around the inner tubular portion 172 and defines a spring pocket 176 therebetween for receiving an end of the coil spring 106. The outer tubular portion 174 also defines the annular bore 178 for receiving the first O-ring seal 103.

In some embodiments, the FD valve 90 can operate as an open system where the input and output (i.e. passages providing fluid flow into and out of the FD pressure chamber 116) are isolated. For example, and as shown in FIG. 6, the FD slider 102 may define a hole 180 extending therethrough. In this case, pressure ratio in FD pressure chamber 116 depends on the ratio of flow areas through inlet and outlet passages (i.e. fluid flow into the FD pressure chamber 116 through the control orifice 96 in the FD control disc 94, and out through the hole 180 in the FD slider 102. Alternatively, the FD valve 90 can be operated as a closed system, with the input and output connected together. For example, a single passage, such as the control orifice 96 in the FD control disc 94, may function as both an inlet and an outlet for fluid to enter and exit the FD pressure chamber 116, and there may be no other passages for fluid to flow into or out of the FD pressure chamber 116.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A damper assembly comprising:

a damper tube having a tubular shape extending along a center axis and defining a fluid compartment;

a piston attached to a damper rod and movable through the damper tube along the center axis and dividing the fluid compartment into a compression chamber and a rebound chamber, the piston including a piston body and a frequency-dependent (FD) valve;

the piston body defining an intermediate chamber in fluid communication with the rebound chamber; and the FD valve including: an FD housing having a tubular shape surrounding an FD chamber, an FD slider disposed within the FD housing and dividing the FD chamber into an FD pressure chamber and an FD displacement chamber, an FD control stack configured to regulate fluid flow between the intermediate chamber and the FD pressure chamber, and an FD working disc configured to deflect together with the FD housing for regulating fluid flow between the rebound chamber and the compression chamber.

2. The damper assembly of claim 1, wherein the FD control stack includes an FD control disc defining a control orifice providing fluid communication between the intermediate chamber and the FD pressure chamber.

3. The damper assembly of claim 1, wherein the FD control stack includes an FD deflective disc and a slotted disc supporting the FD deflective disc and defining an aperture allowing fluid pressure in the intermediate chamber to act upon the FD deflective disc for causing the FD deflective disc to be deflected away from the slotted disc and thus allowing fluid flow around the FD deflective disc and into FD pressure chamber.

4. The damper assembly of claim 1, wherein the FD housing defines a catch surface configured to engage the FD slider and to define a maximum axial travel limit of the FD slider relative to the FD housing.

5. The damper assembly of claim 4, wherein the FD control stack includes an FD deflective disc and a slotted disc supporting the FD deflective disc, wherein the FD housing includes a first axial end contacting an upper surface of the slotted disc adjacent to a peripheral edge thereof, and wherein the FD slider is configured to bias the FD housing away from the slotted disc at the maximum axial travel limit and to thereby increase flow through the FD valve.

6. The damper assembly of claim 1, wherein the FD slider defines a hole therethrough providing for the FD valve to be operated as an open system.

7. The damper assembly of claim 1, wherein the FD slider has a solid configuration to providing for the FD valve to be operated as a closed system with a single passage functioning as both an inlet and an outlet for fluid to enter and exit the FD pressure chamber.

8. The damper assembly of claim 1, wherein the piston further includes a compression valve assembly and a rebound valve assembly each disposed on an end of the piston body adjacent to the rebound chamber.

9. The damper assembly of claim 1, wherein the piston further includes a compression valve assembly and a rebound valve assembly, and wherein the FD valve is disposed on an end of the piston body opposite from each of the rebound valve assembly and the compression valve assembly.

10. The damper assembly of claim 1, wherein the FD valve further comprises an FD guide having a tubular shape disposed around the damper rod and providing a fluid-tight seal with the FD slider.

11. The damper assembly of claim 1, wherein the FD valve further comprises a spring configured to bias the FD slider toward the FD control stack.

12. The damper assembly of claim 11, wherein the FD valve further comprises a spring retainer extending annularly around the damper rod, and the spring includes a coil spring extending around the damper rod and extending between the spring retainer and the FD slider.

13. A piston for a damper assembly, comprising:

a piston body defining an intermediate chamber; and a frequency-dependent (FD) valve including: an FD housing having a tubular shape surrounding an FD chamber, an FD slider disposed within the FD housing and dividing the FD chamber into an FD pressure chamber and an FD displacement chamber, an FD control stack configured to regulate fluid flow between the intermediate chamber and the FD pressure chamber, and an FD working disc configured to deflect together with the FD housing for regulating fluid flow between a rebound chamber and a compression chamber.

14. The piston of claim 13, wherein the FD control stack includes an FD control disc defining a control orifice providing fluid communication between the intermediate chamber and the FD pressure chamber.

15. The piston of claim 13, wherein the FD control stack includes an FD deflective disc and a slotted disc supporting the FD deflective disc and defining an aperture allowing fluid pressure in the intermediate chamber to act upon the FD deflective disc for causing the FD deflective disc to be deflected away from the slotted disc and thus allowing fluid flow around the FD deflective disc and into FD pressure chamber.

16. The piston of claim 13, wherein the FD housing defines a catch surface configured to engage the FD slider and to define a maximum axial travel limit of the FD slider relative to the FD housing.

17. The piston of claim 16, wherein the FD control stack includes an FD deflective disc and a slotted disc supporting the FD deflective disc, wherein the FD housing includes a first axial end contacting an upper surface of the slotted disc adjacent to a peripheral edge thereof, and wherein the FD slider is configured to bias the FD housing away from the slotted disc at the maximum axial travel limit and to thereby increase flow through the FD valve.

18. The piston of claim 13, wherein the FD slider defines a hole therethrough providing for the FD valve to be operated as an open system.

19. The piston of claim 13, wherein the FD slider has a solid configuration to providing for the FD valve to be operated as a closed system with a single passage functioning as both an inlet and an outlet for fluid to enter and exit the FD pressure chamber.

20. The piston of claim 13, further including a compression valve assembly and a rebound valve assembly, and wherein the FD valve is disposed on an end of the piston body opposite from each of the rebound valve assembly and the compression valve assembly.

* * * * *